United States Patent

Burrage

[15] 3,649,825

[45] Mar. 14, 1972

[54] APPARATUS FOR FUNCTION GENERATION BY LINEAR INTERPOLATION

[72] Inventor: Robert Graham Burrage, Solihull, England

[73] Assignee: Joseph Lucas (Industries) Limited, Birmingham, England

[22] Filed: Nov. 25, 1969

[21] Appl. No.: 879,823

[52] U.S. Cl. ....235/197, 235/150.53, 235/194

[51] Int. Cl. ....G06g 7/30

[58] Field of Search ....235/150.53, 186–197, 235/152; 307/229–230

[56] References Cited

UNITED STATES PATENTS

| | | | |
|---|---|---|---|
| 3,358,130 | 12/1967 | Miura et al | 235/193 X |
| 3,373,273 | 3/1968 | Schubert | 235/197 |
| 3,480,767 | 11/1969 | Howe | 235/150.53 |
| 3,506,810 | 4/1970 | Katell | 235/197 X |
| 3,513,301 | 5/1970 | Howe | 235/150.53 |
| 3,538,319 | 11/1970 | Howe | 235/194 |

*Primary Examiner*—Eugene G. Botz
*Assistant Examiner*—Felix D. Gruber
*Attorney*—Holman and Stern

[57] ABSTRACT

The invention relates to an apparatus for generating a mathematical function of the type $y=f(x)$ by linear interpolation between two values $y_1$, $y_2$ which are known for two values $x_1$, $x_2$.

The apparatus includes two function generators respectively producing values $y_1$, $y_2$. Associated with each function generator is an interpolation function generator. The interpolation function generators produce, for a value of $x$ lying between $x_1$ and $x_2$ signals corresponding to $$\frac{x_2-x}{x_2-x_1} \quad \text{and} \quad \frac{x-x_1}{x_2-x_1}$$

respectively.

10 Claims, 6 Drawing Figures

PATENTED MAR 14 1972 3,649,825

INVENTOR
Robert Graham Burrage
BY Holman, Glascock, Downing & Seebold
ATTORNEYS

INVENTOR
Robert Graham Burrage
BY Holman, Glascock, Downing & Seebold
ATTORNEYS

INVENTOR
Robert Graham Burrage
BY Holman, Glascock, Downing & Seebold
ATTORNEYS

INVENTOR
Robert Graham Burrage
BY Holman, Glascock, Downing & Seebold
ATTORNEYS

APPARATUS FOR FUNCTION GENERATION BY LINEAR INTERPOLATION

SUMMARY OF THE INVENTION

Two multiplier circuits respectively multiply the outputs of each function generator and its associated interpolation function generator, thus $$y_1 \cdot \frac{x_2 - x}{x_2 - x_1} \quad \text{and} \quad y_2 \cdot \frac{x - x_1}{x_2 - x_1}$$

The apparatus also includes an adding circuit to sum the outputs of the multipliers to give $$y_1 \cdot \frac{x_2 - x}{x_2 - x_1} + y_2 \cdot \frac{x - x_1}{x_2 - x_1}$$

which is a known formula for linear interpolation.

The apparatus may include a large number of function generators, each with an associated interpolation function generator and multiplier. For any given value of $x$ there will be an output from only two adjacent multipliers.

The apparatus may be used to interpolate a function containing more than one independent variable, by arranging that the function generators have outputs which are functions of all the variables.

This invention relates to apparatus for generating a mathematical function by linear interpolation.

In a mathematical function of the type $y=f(x)$ for which the values $y_1$, $y_2$ are known for two values $x_1$, $x_2$ it is possible, by linear interpolation, to obtain an approximation for the value of $y$ for any $x$ between $x_1$ and $x_2$ by applying the formula $$y = y_1 \cdot \frac{x_2 - x}{x_2 - x_1} + y_2 \cdot \frac{x - x_1}{x_2 - x_1}$$

It is an object of the invention to provide an apparatus for generating a mathematical function by linear interpolation of the type described.

According to the invention an apparatus for linear interpolation comprises at least first and second function generators for producing electrical signals corresponding to $y_1=f(x_1)$ and $y_2=f(x_2)$ respectively, where $x_1$ and $x_2$ are previously determined values of $x$, at least first and second interpolation function generators each of which is associated with a corresponding one of the function generators, the said interpolation function generators producing, on receipt of an input signal corresponding to a value of $x$ lying between $x_1$ and $x_2$, electrical signals corresponding to $(x_2-x)/(x_2-x_1)$ and $(x-x_1)/(x_2-x_1)$ respectively, at least first and second multiplying circuits for producing electrical signals proportional to the products.

$$y_1 \cdot \frac{x_2 - x}{x_2 - x_1} \quad \text{and} \quad y_2 \cdot \frac{x - x_1}{x_2 - x_1}$$

of the output signals of each function generator and each corresponding interpolation function generator, and an adding circuit for producing an output signal corresponding to the sum of the signals produced by the said multiplying circuits.

An apparatus in accordance with the invention will now be described by way of example and with reference to the following drawings in which.

Figure 1:
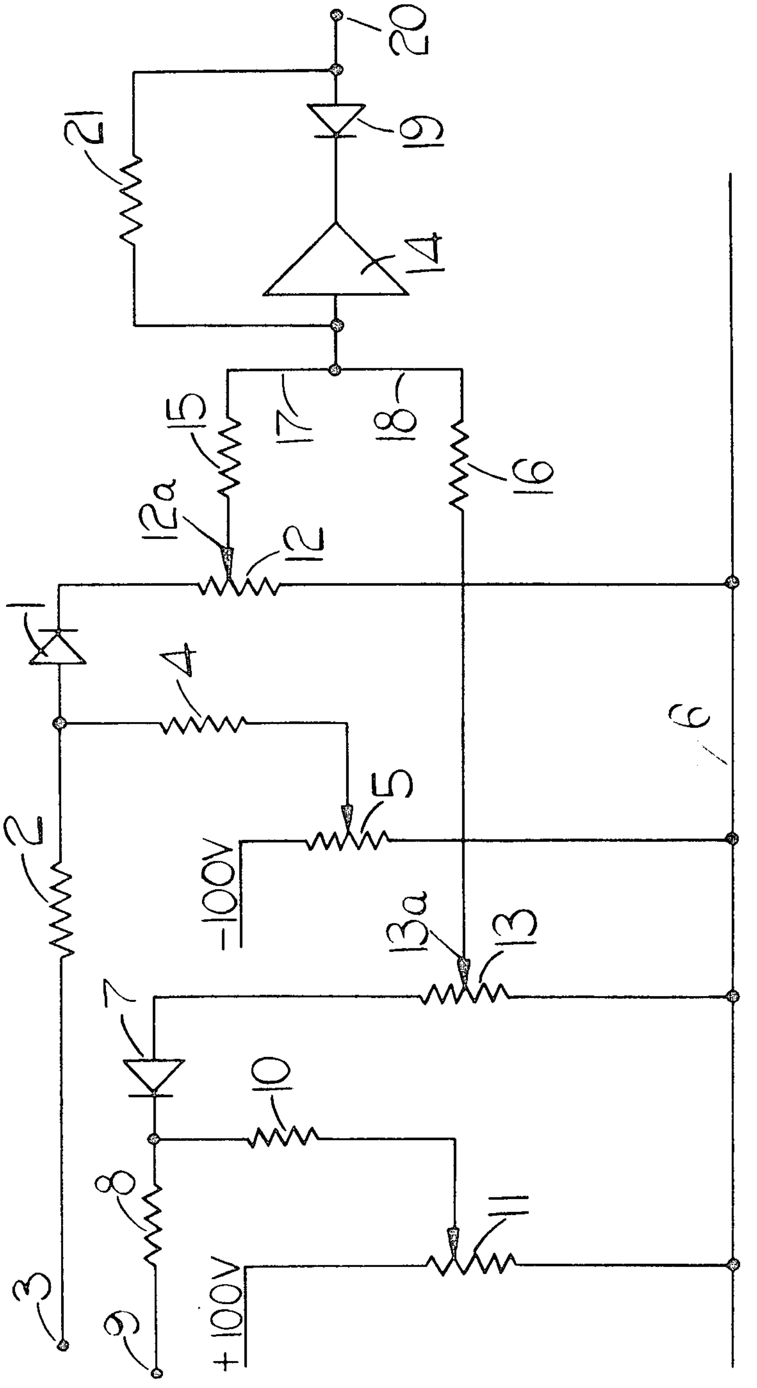
FIG. 1 shows an electrical circuit producing linearly variable voltages.

FIG. 1 shows an interpolation function generator in which a first diode 1 has its anode connected via a resistor 2 to a first input terminal 3 and also via a resistor 4 to the moving point of a potentiometer 5. The potentiometer 5 is connected between a −100 v. supply and a common line 6. A second diode 7 has its cathode connected via a resistor 8 to a second input terminal 9 and also via a resistor 10 to the variable point of a potentiometer 11. The potentiometer 11 is connected between a +100 v. supply and the common line 6. The cathode of the diode 1 is connected via a potentiometer 12 to the common line 6. The anode of the diode 7 is connected via a potentiometer 13 to the common line 6. The wipers of the potentiometers 12, 13 are commonly connected to the input of an amplifier 14 via identical resistors 15, 16 and lines 17, 18 respectively. A diode 19 has its cathode connected to the output of the amplifier 14 and its anode connected to an output terminal 20. A resistor 21 is connected in parallel across the amplifier 14 and the diode 19.

In use the voltages applied to the inputs 3, 9 will be of equal magnitude but of opposite polarity. The −100 v. supply applies a negative bias to the anode of the diode 1 via the potentiometer 5 and resistor 4. The magnitude of this negative bias will depend on the setting of the potentiometer 5. In a like manner the +100 v. supply applies a required level of positive bias to the cathode of the diode 7 via the potentiometer 11 and resistor 10. When the input 3 is sufficiently positive to overcome the negative bias on the diode 1 a current flow through the potentiometer 12 and a positive voltage appears on the moving point 12*a* of potentiometer 12. Once the negative bias has been overcome the rate of change of this positive voltage with respect to the change of voltage applied to the input 3 will depend on the setting of the potentiometer 12. In a like manner a negative voltage varying proportionately to the voltage applied to the input 9 appears on the moving point 13*a* of the potentiometer 13. The resultant current in lines 17, 18 produces at their junction a voltage proportional to the sum of the voltages on the moving points 12*a*, 13*a*, the said proportional voltage being applied to the amplifier 14. The resistor 21 provides a feedback signal for the amplifier 14.

Figure 2:
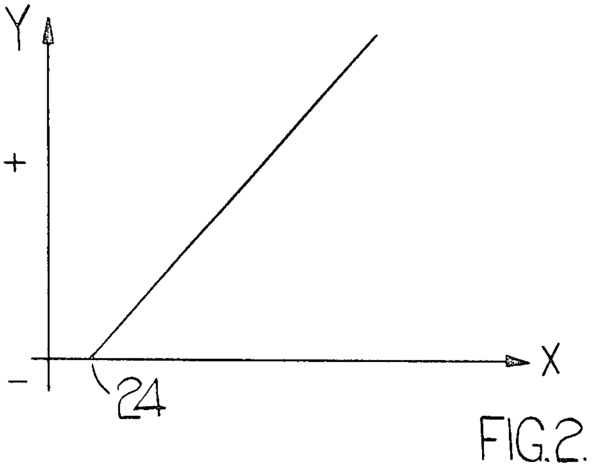
FIGS. 2, 3 and 4 show graphically the variations of voltage produced by the apparatus in FIG. 1.

Variation of the voltage appearing at point 12*a* as a result of variations in the voltage applied to the input terminal 3 are shown graphically in FIG. 2 in which the X axis represents the amplitude of the voltage applied to the input terminal 3 and the Y axis represents the value of the resultant voltage on line 17. The point 24 indicates the level of bias applied to the diode 1. In a like manner the rate of change of voltage at point 13*a* with respect to change in the amplitude of voltage at the input terminal 9 is shown graphically in FIG. 3 in which the point 25 represents the level of bias applied to the diode 7.

Figure 3:
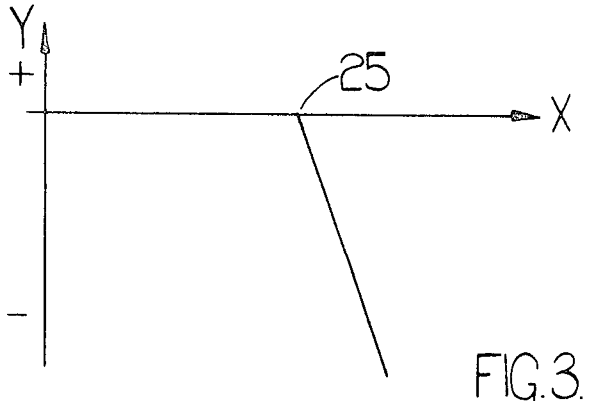
Figure 4:
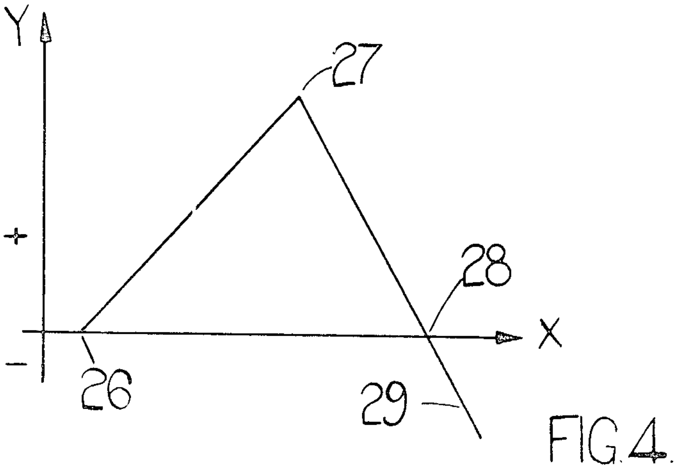

The output of the interpolation function generator will be a voltage proportional to the algebraic sum of the voltages at points 12*a*, 13*a* and provided that the voltage slope as shown in FIG. 3 is greater than that shown in FIG. 2, the output characteristic will be similar to that shown in FIG. 4 in which the point 26 has an X ordinate corresponding to the bias applied to the diode 1, the peak 27 has an X ordinate corresponding to the bias applied to the diode 7 and the characteristic crosses the X axis at point 28 and has a negative-going portion 29. The diode 19 acts to prevent this negative voltage from appearing at the output 20 by preventing feedback via the resistor 21. Adjustment of the potentiometers 5,11, 12, 13 thereby enables the X ordinates of the points 26, 27 and 28 and the Y ordinate of the point 27 to be set to any desired value.

Figure 5:
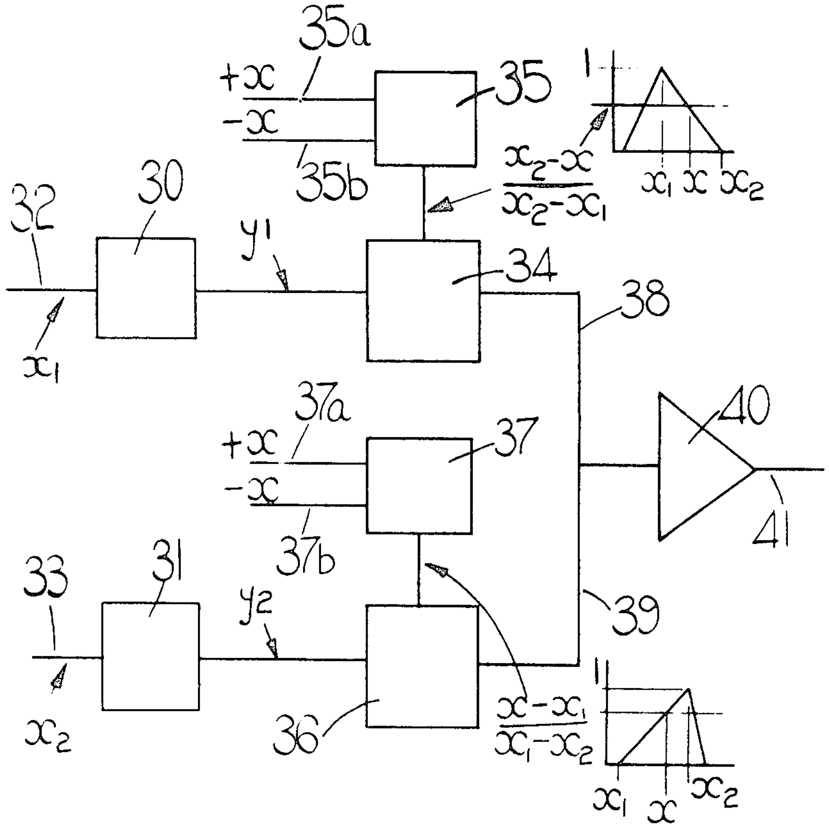
FIG. 5 shows an arrangement of a pair of circuits of the type shown in FIG. 1 in an apparatus for interpolation of a mathematical function.

FIG. 5 shows diagrammatically an example of an apparatus for linear interpolation in which a pair of function generators 30, 31 have inputs 32, 33 respectively. Generators 30, 31 are hybrid analog/digital function generators of the type described by Huskey and Korn in "Computer Handbook" (McGraw - Hill 1962), are such that functions of one, two, or more independent variables may be generated. One or more of these independent variables may be provided as an external signal, and others of the independent variables stored within the function generators 30, 31 in a known manner on a drum or tape. Function generator 30 supplies one input to a multiplier 34 whose other input is supplied from a first interpolation function 35, substantially as previously described with reference to FIG. 1, and which has inputs 35*a*, 35*b*. In a like manner a multiplier 36 has its inputs supplied by the function generator 31 and a second interpolation function generator 37, itself having inputs 37*a*, 37*b*. The multipliers 34, 36 have outputs 38, 39 respectively which are commonly connected to the input of an adder 40 having an output 41.

In one method of use signals corresponding to the values $x_1$ and $x_2$ are applied to the inputs 32, 33 respectively of the function generators 30, 31, resulting in signals corresponding to $y_1$ and $y_2$ being applied to one input of the multipliers 34, 36 respectively. The X ordinates of the points 27, 28 on the characteristic of the first interpolation function generator 35 will correspond to the values $x_1$ and $x_2$ respectively. The X ordinates of the points 26, 27 on the characteristic of the second interpolation function generator will also correspond to the values $x_1$ and $x_2$ respectively. The peaks 27 of the characteristics of the interpolation function generators 35, 37 will be set by means of any known measuring device as for example, an oscilloscope to a substantially identical level, which level may conveniently be regarded as unity.

A signal corresponding to a value of $x$ lying between the values $x_1$ and $x_2$ is applied to the inputs 35*a* and 37*a*. A signal of equal magnitude but of opposite polarity is applied to the inputs 35*b* and 37*b*. The first interpolation function generator 35 will therefore have as its output a signal which varies linearly from unity when $x=x_1$ to zero when $x=x_2$. In a like manner the second interpolation function generator 37 will generate a signal which varies linearly from zero when $x=x_1$ to unity when $x=x_2$. The outputs of the interpolations function generators 35, 37 will therefore respectively correspond to $(x_2-x)/(x_2-x_1)$ and $(x-x_1)/(x_2-x_1)$ for any value of $x$. The signals appearing on the outputs 38, 39 of the multipliers 34, 36 will therefore correspond respectively to $$y_1 \cdot \frac{x_2-x}{x_2-x_1} \quad \text{and} \quad y_2 \cdot \frac{x-x_1}{x_2-x_1}$$

These signals are summed in the adder 40 to produce at the output 41 a signal corresponding to the interpolation value of $y$.

Figure 6:
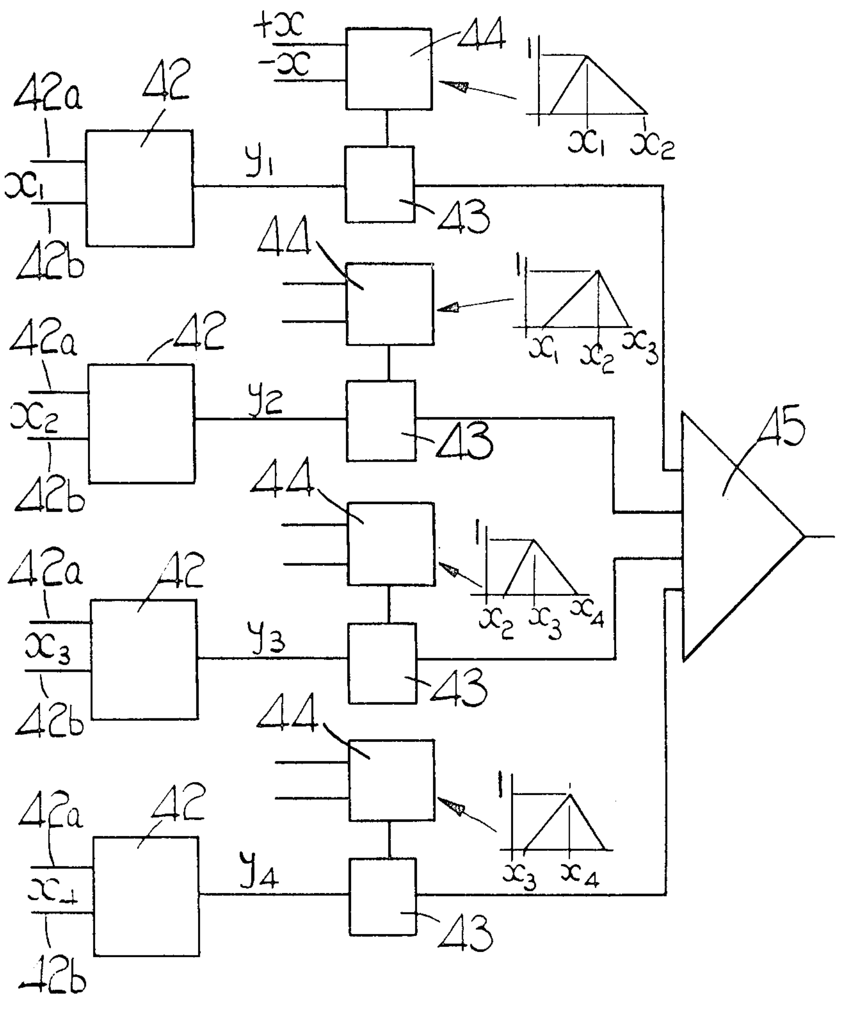
FIG. 6 shows an arrangement having more than two circuits of the type shown in FIG. 5.

FIG. 6 shows an apparatus having more than two stages, each stage comprising a function generator above, with input lines 42*a*, 42*b* and an associated multiplier 43 and interpolation function generator 44. The outputs of the multipliers 43 are summed in a single adder 45.

In an apparatus having more than two stages and used in accordance with the method described above, each function generator 42 will have as its input a signal corresponding to a predetermined value of $x$, the said values of $x$ increasing from the first to the final function generator. The X ordinate of the peak 27 for each interpolation function generator 44 will correspond to the value of $x$ providing the input to its associated function generator 42. The X ordinates of the points 26, 28 will correspond to the values of $x$ providing the inputs of the next preceding and next subsequent function generator respectively. The Y ordinates of the peaks 27 of the characteristics of the interpolation function generators 44 are set to substantially the same level.

In an alternative method of use signals corresponding to a single predetermined value of a third variable $z$ are applied to the inputs 32, 33 (FIG. 5). The function generators 30, 31 are arranged to produce separate functions of $x$ and $z$ resulting in a variable $y$ such that $y_1=f(x_1,z)$ and $y_2=f(x_2,z)$, the signals corresponding to $y_1$ and $y_2$ being applied to one input of the multipliers 34, 36 as before. The inputs to the interpolation function generators 35, 37 will be a signal lying between $x_1$ and $x_2$. The interpolation function generators operate as previously described in conjunction with the multipliers 34, 36 to produce signals which are subsequently summed in the adder 40 to give rise at the output 41 to a signal corresponding to an interpolated value of $y$. It will be appreciated that the apparatus used in this way may be used to interpolate for one variable in a function having any number of other variables.

An apparatus in accordance with the invention and having more than two stages when used in accordance with the alternative method described above will have the X ordinate of the peak 27 for each interpolation function generator set as before to a value corresponding to the value of $x$ providing the input to its associated function generator. The X ordinates of the points 26, 28 will correspond to the values of $x$ providing the inputs of the next preceding and next subsequent function generator respectively.

It will be understood that the input signals to the function generators and the interpolation function generators may be arranged so that interpolation may be performed for a function having any desired number of variables. Where the outputs of the function generators are functions of more than one variable, one of the variables may be set or generated within each function generator as in the arrangement shown in FIG. 5. Alternatively two or more of the variables may be supplied to each function generator via input lines, as shown in FIG. 6.

Having thus described my invention what I claim as new and desire to secure by Letters Patent is:

1. An apparatus for generating a mathematical function by linear interpolation comprising at least first and second function generators for producing on receipt of signals corresponding to $x_1$ and $x_2$ electrical output signals corresponding to $y_1=f(x_1)$ and $y_2=f(x_2)$ respectively, where $x_1$ and $x_2$ are previously determined values of $x$, at least first and second interpolation function generators each of which is associated with a corresponding one of the function generators, the said interpolation function generators producing, on receipt of two input signals corresponding to a value of $x$ lying between $x_1$ and $x_2$, electrical signals corresponding to $(x_2-x)/(x_2-x_1)$ and $(x-x_1)/(x_2-x_1)$ respectively at least first and second multiplying circuits having as input signals the output signals of the respective associated function generators and interpolation function generators, for producing electrical signals proportional to the products $$y_1 \cdot \frac{x_2-x}{x_2-x_1} \quad \text{and} \quad y_2 \cdot \frac{x-x_1}{x_2-x_1}$$

of the output signals of each function generator and each corresponding interpolation function generator, and an adding circuit for producing an output signal corresponding to the sum of the signals produced by the said multiplying circuits.

2. An apparatus as claimed in claim 1 in which the input to each interpolation function generator comprises first and second signals of equal magnitude and opposite polarity and each interpolation function generator includes means for generating a pair of voltages which are respective functions of the said two input signals and each interpolation function generator includes means for summing the said pair of voltages.

3. An apparatus as claimed in claim 2 which includes means for causing all said signals produced by the interpolation function generators to have the same polarity.

4. An apparatus as claimed in claim 2 which includes means for causing the output signal of each interpolation function generator to have a peak level at a predetermined value of $x$, and which also includes means for causing the said peak output levels to be substantially identical.

5. An apparatus as claimed in claim 4 in which each interpolation function generator includes a first regulating means for causing the said peak output level to occur when the value of the signal input to the said interpolation function generator corresponds to the said previously determined value of $x$ forming the input to the associated function generator.

6. An apparatus as claimed in claim 5 in which the said first regulating means comprises a rectifying means which receives the first of the said two input signals and biasing means associated with the rectifying means.

7. An apparatus as claimed in claim 4 which includes means for causing the output signal of each interpolation function generator to be zero at predetermined values of $x$.

8. An apparatus as claimed in claim 7 in which each interpolation function generator includes a second regulating means for causing the said output signals to be zero at the said previously determined values of $x$ respectively providing the inputs to the next preceding and next subsequent function generators.

9. An apparatus as claimed in claim 8 in which the said second regulating means comprises rectifying means which receives the second of the said two input signals, biasing means associated with the rectifying means and means for varying the value of the voltage which is a function of the first of the said two input signals.

10. An apparatus as claimed in claim 1 in which each function generator produces an electrical signal corresponding to a value of $y$ when the said value of $y$ is a function of one or more variables in addition to $x$.

* * * * *